United States Patent [19]

Gross et al.

[11] 4,093,537
[45] June 6, 1978

[54] FCC CATALYST SECTION CONTROL

[75] Inventors: Benjamin Gross; Wooyoung Lee, both of Cherry Hill, N.J.

[73] Assignee: Mobil Oil Corporation, New York, N.Y.

[21] Appl. No.: 769,639

[22] Filed: Feb. 17, 1977

Related U.S. Application Data

[63] Continuation-in-part of Ser. No. 608,351, Aug. 27, 1975, abandoned, and Ser. No. 608,352, Aug. 27, 1975, abandoned.

[51] Int. Cl.² .............................................. C10G 13/18
[52] U.S. Cl. ............................... 208/164; 208/DIG. 1; 252/417
[58] Field of Search ................ 208/113, 164, DIG. 1; 252/417

[56] References Cited
U.S. PATENT DOCUMENTS

| | | | |
|---|---|---|---|
| 3,316,170 | 4/1967 | Stewart et al. | 208/164 |
| 3,769,203 | 10/1973 | Lee et al. | 208/164 |
| 3,886,060 | 5/1975 | Owen | 208/155 |
| 3,893,812 | 7/1975 | Conner et al. | 208/164 |

Primary Examiner—Herbert Levine
Attorney, Agent, or Firm—Charles A. Huggett; Vincent J. Frilette

[57] ABSTRACT

In the fluid catalytic cracking process, improved adaptive behavior of the catalyst section with the regenerator operating in the complete CO-burning mode is achieved by including, as elements of control, variable preheat of the air feed and variable recycle of regenerated catalyst to spent catalyst. In response to excursions of the regenerated catalyst temperature, such as would be caused by change of feedstock, the air preheat temperature and recycle ratio are altered in a direction to restore the regenerated catalyst temperature to a predetermined value. The improved control system extends the useful control range, and it also diminishes counterproductive changes in severity induced by disturbances such as change of feedstock quality.

9 Claims, 3 Drawing Figures

FCC CATALYST SECTION CONTROL

CROSS REFERENCE TO RELATED APPLICATIONS

This application is a continuation-in-part of U.S. patent application Ser. No. 608,351, filed Aug. 27, 1975, and of U.S. patent application Ser. No. 608,352, filed Aug. 27, 1975 both now abandoned.

BACKGROUND OF THE INVENTION

1. Field of the Invention

This invention relates to an improved method and apparatus for controlling a fluid catalytic cracking system. More specifically, the present invention includes controlled preheat of the air feed, and may include variable recycle of regenerated to spent catalyst in the regenerator.

2. Description of the Prior Art

Fluid catalytic cracking of petroleum fractions is a well-established refinery operation. The catalytic cracking apparatus per se comprises a catalyst section which is subdivided into a reactor section where catalytic cracking occurs, coupled with a regenerator section where coke deposited on spent catalyst is burned. The process operates essentially as follows. Fresh feed, usually preheated, mixed with catalyst, undergoes cracking within the reactor section. Products are removed from the reactor in the vapor phase and passed to a products recovery section comprising at least one main fractionator or distillation column for separation of the products into desired fractions. Spent catalyst, which has been coked by the cracking reaction, is continuously passed from the reactor to the regenerator by a spent catalyst transfer line. In the regenerator, the coke is burned by contact with a oxygen containing gas. Flue gas is passed from the regenerator, and regenerated catalyst is recirculated to the reactor via a standpipe where it is picked up by the fresh feed hydrocarbon charge steam. The catalyst itself is finely divided and simulates a fluid in various portions of the catalyst section, whence the name of the process. In a typical operation, heat generated in the regenerator is carried by the hot regenerated catalyst to the reactor to supply heat for the cracking reactions. Typical fluid catalyst cracking systems are disclosed in U.S. Pat. Nos. 3,206,393 and 3,261,777.

The fluid catalytic cracking process has been improved in efficiency over the years. In particular, the discovery of zeolite catalysts with their greater activity and reduced coke make, and improvements in design of the reactor section to emphasize riser-cracking, are cases in point.

A recent innovation in regenerator section technology promises simultaneously to simplify the apparatus, more effectively utilize the heat evolved in regeneration, contribute better product quality, and reduce the inventory of catalyst. Whereas the conventional regenerator technology produces regenerated catalyst with about 0.3 wt.% residual coke, and a flue gas rich in carbon monoxide, the innovative technology produces regenerated catalyst substantially free of coke, i.e. less than about 0.08 wt.% and a flue gas in which the CO (carbon monoxide) has been substantially all burned to $CO_2$(carbon dioxide), i.e. the flue gas has a CO content less than about 4000 ppm and preferably less than about 2000 ppm (As used herein, ppm refers to parts per million parts by volume.) With the innovative technology, the need disappears for the CO-boiler plant conventionally used to complete the CO burning and recover sensible heat, because complete CO-burning takes place in the regenerator itself. Aside from simplified apparatus, other advantages accrue from the innovation which include: more active regenerated catalyst; better gasoline quality; more efficient transfer to the reactor section of the heat generated in coke burnoff; and a flue gas composition ecologically suitable for direct discharge to the atmosphere. For convenience, the conventional fluid catalytic cracking technology, in which the flue gas from the regenerator section contains substantially more than about 4000 p.p.m. of CO, will be characterized herein as operating in the "partial CO-burning mode." The process operating according to the innovative technology, in which the CO content of the flue gas is about 4000 p.p.m. or less, will be referred to herein as operating in the "complete CO-burning mode."

In spite of the significant advantages of the innovative technology, its widespread acceptance by the petroleum industry is questionable. For example, relatively small disturbances in the feedstock could cause premature failure of the cyclones used in the regenerator to disengage regenerated catalyst from flue gas. Also, there is very serious question that available control systems can make the catalytic cracking apparatus sufficiently adaptive to accept changes of feedstock quality without major or catastrophic upsets such as would lead to shutdown of the plant.

The problems that are encountered with control of fluid catalytic systems operating in the complete CO-burning mode may, at first glance, appear to be related to the unusually high temperatures that presently obtain in the regenerator. However, it will be shown that a serious, more subtle constraint is present.

SUMMARY OF THE INVENTION

This invention provides an improved method for controlling the operation of a fluid catalytic cracking system comprising a reactor section and a regenerator section that operates in the complete CO-burning mode. In particular, a measured regenerator temperature is compared with a predetermined regenerator temperature, or with a measured temperature difference or with a combination of the two, within the regenerator, as will be more fully explained hereinafter, and the air feed temperature is adjusted in response to a function of this comparison in a direction to restore the measured regenerator temperature to the predetermined temperature. In one embodiment of this invention, the method further provides for adjusting the recycle ratio of regenerated to coked catalyst within the regenerator section in a direction to restore the measured regenerator temperature to the predetermined temperature.

In another aspect of the present invention, a system is provided for controlling the catalyst section of a fluid catalytic cracking apparatus with the regenerator operating in the complete CO-burning mode, said system providing means for comparing a regenerator temperature, or a temperature difference within the regenerator, with a corresponding predetermined temperature or temperature difference, to generate a temperature deviation, and means for adjusting the air feed temperature in a direction to reduce said deviation. The system, in one embodiment, also includes means responsive to said deviation for adjusting the recycle ratio of regenerated to coked catalyst within the regenerator, in a direction to reduce said deviation.

DETAILED DESCRIPTION OF THE INVENTION

Figure 1:
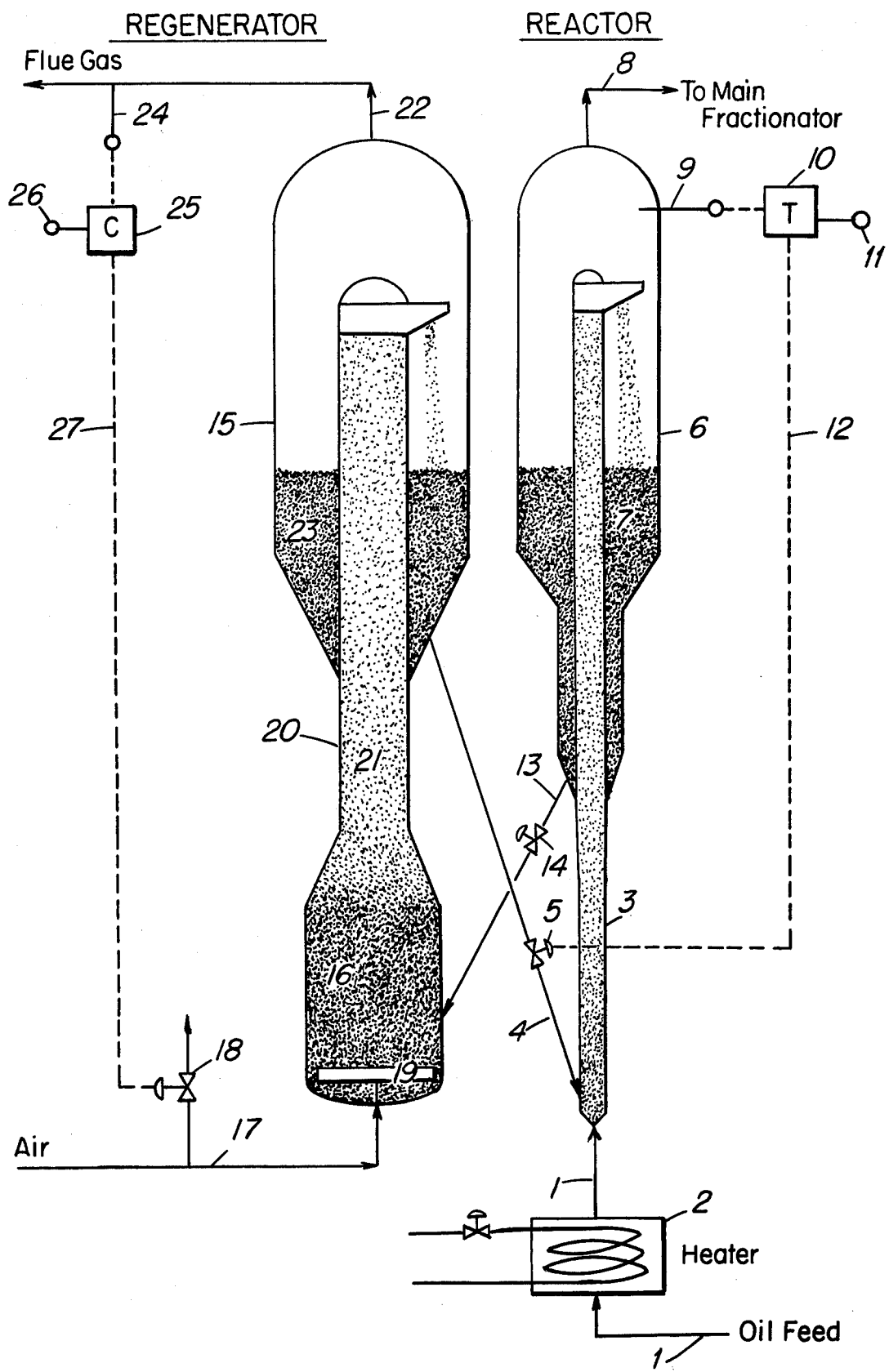
FIG. 1 is a schematic representation of a prior art catalyst section control system operating in the complete CO-burning mode.

A conventional control scheme for a catalyst section with the regenerator section operating in the complete CO-burning mode is illustrated in FIG. 1 (prior art). In FIG. 1 the oil feed, which may be preheated by the heater 2 is passed via line 1 to the lower end of riser pipe 3. Heated catalyst from a standpoint 4 having a control valve 5 is combined with the heated oil in the riser line 3 such that an oil-catalyst mixture rises in an ascending dispersed stream until it is discharged into reactor 6 and settles as a dense bed 7. In the reactor 6, there may be other fluidized contacting between oil and the catalyst particles within the relatively dense fluidized bed 7. Generally, a major portion of the necessary cracking and contact of the oil with the catalyst takes place in riser line 3. Any catalyst particles remaining suspended in the vaporous cracked reaction products are separated at the upper end of reactor 6 by centrifugal or settler type means (not shown). Products are then transferred overhead via line 8 to a products recovery section (not shown) which includes at least one fractionator. A temperature sensing means 9, such as a thermocouple, is provided to sense the temperature within reactor 6 and to provide a signal to the temperature controller 10 indicative of the temperature in the reactor 6. When the temperature of the reactor deviates from the predetermined temperature defined by the set point 11 of the temperature controller 10, the temperature controller places a signal on a line 12 to adjust the valve 5 and thus adjust the temperature of the catalyst oil mixture in riser 3 in a direction to reduce the deviation of the measured temperature from the predetermined temperature as defined by the set point 11 of the controller 10. Generally, it is highly desirable to minimize fluctuations of the temperature within reactor 6 and of the products issuing from line 8 so as to minimize disturbances in the main fractionator column. Spent catalyst from the bed 7 is continuously passed from reactor 6 by spent catalyst transfer line 13 equipped with a valve 14, and is passed to the lower portion of the regenerator 15 to form a relatively dense bed 16. Air is passed via air transfer line 17 equipped with a control valve 18 to the regenerator 15, where it passes through disperser 19 and serves to maintain bed 16 in a fluidized state and to pass catalysts continuously through the riser 20 as a dilute phase 21. In the upper portion of the regenerator 15 flue gas at substantially the same temperature as the hot regenerated catalyst is separated from said regenerated catalyst, and exits via line 22. Regenerated catalyst settles to form a relatively dense bed 23. The regenerated catalyst bed 23 is at a substantially higher temperature than the spent catalyst from bed 7 by virtue of the coke burning which occurs in the regenerator 15. Typically, this difference may be about 375° F. Within the regenerator itself, bed 23 and the flue gas in the chamber are substantially hotter than the spent but partially regenerated catalyst of bed 16, differences of about 100° F being not uncommon. A composition sensor 24, which indicates the carbon monoxide and oxygen content of the flue gas, generates a signal indicative of that composition. Valve 18 is commonly controlled by operator intervention to control the flow of air and thus the CO and oxygen content of the flue gas. Alternatively, the signal generated by composition sensor 24 is transmitted to the composition controller 25. Controller 25, equipped with set points 26, places a signal on line 27, which signal is indicative of the deviation of the carbon monoxide composition of the flue gas from the set point 26, to adjust the control valve 18 in a direction to reduce the deviation of the measured composition from the predetermined composition as defined by the set point 26. In general, the set point is adjusted to a CO content less than 2000 ppm and the flue gas, in general, will contain about 2% excess oxygen gas. Although no explicitely shown, valve 14 is usually coupled with valve 5 in such a manner as to maintain a fixed ratio of amount of catalyst in the regenerator 15 to amount of catalyst in the reactor 6.

Figure 2:
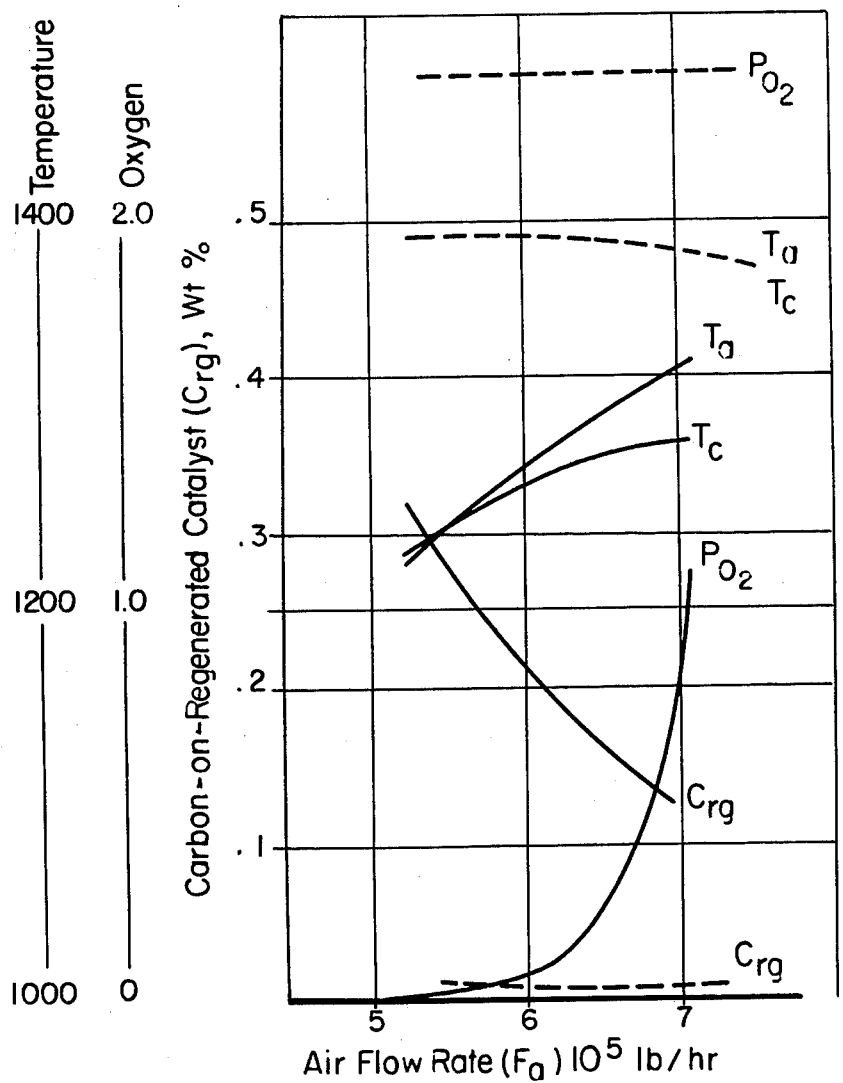
FIG. 2 are graphs of data generated by manipulation of a mathematical model.

With the control system described above for operation in the complete CO burning mode, the operation in general is conducted in a manner to insure that substantially all of the coke deposited on the catalyst in the reactor section is burned in the regenerator, that is, the residual carbon on regenerated catalyst is generally below about 0.05 wt.%. High temperatures obtain in the regenerator and the regenerated catalyst in bed 23 is generally at a temperature of at least about 1350° F. In the absence of fluctuations in the amount of coke deposited by the feed during cracking, or of fluctuations in feed temperature, or of other disturbances, the described control system will give smooth operation of the catalyst section. However, a study of the control system reveals that its adaptive behavior to sudden changes in the amount of coke formed, and thus to variations in feedstock quality, is considerably poorer than when operating in the partial CO-burning mode. Furthermore, the changes that do occur are counterproductive with regard to product composition. The reasons for this poor adaptive response will be examined in some detail. In the complete CO-burning mode, because all of the coke is substantially completely burned to $CO_2$ in the regenerator, a change in the rate of coke formation induces temperature excursions in the regenerator which are greater than in the partial CO-burning mode. Furthermore, whereas some measure of control is achievable in the partial CO-burning mode by changing the air flow rate to the regenerator, this option is relatively ineffective in the complete CO-burning mode. Computer simulations of the effect of changes in air flow rate for the two modes of operation are shown in FIG. 2. As shown, reducing the air flow rate in the conventional mode, from about 1% excess oxygen to about 0.25%, causes a substantial decrease in both the catalyst and flue gas outlet temperatures indicated as $T_c$ and $T_a$, respectively. In contrast, a reduction in flow rate in the complete CO-burning mode causes relatively little change in these parameters. Also, the change is in the opposite direction; that is, an increase occurs in $T_c$ and $T_a$. The explanation, in part, for the relative insensitivity of regenerator temperature to air flow rate in the complete CO-burning mode, is that the carbon on regenerated catalyst is essentially unaffected by change in the air flow rate, whereas it is strongly affected in the more conventional operation. Thus, a change in the quality of the feedstock, which results in either a decrease or an increase in the rate of coke formation, produces an inordinate disturbance in the regenerator operating in the complete CO-burning mode, because of the greater temperature excursions and lesser response to air flow rate inherent in such mode.

Note that in the foregoing analysis no mention has been made of temperature constraints per se. Referring to FIG. 1, typical temperatures are about 1250° F for dense bed 16, about 1300° F midway in dilute bed 21, and about 1350° F for dense bed 23 and the flue gas exiting via line 22. These temperatures, particularly in beds 21 and 23 are significantly higher than those conventionally employed in the partial CO-burning mode, and appear to be necessary to induce the burning of CO to $CO_2$. These temperatures cannot at present be reduced significantly without overriding the control limits of controller 25, nor can they be increased significantly without exceeding the ordinary design limits of the equipment and risk of catalyst damage. Thus, the high regenerator temperatures that currently obtain in the complete CO-burning mode constitute a third factor, in addition to greater temperature excursions and lesser response to air flow rate, which render present control systems poorly adaptive to changes in feedstock quality. However, significant advantages would still accrue from the present invention even if it were possible to operate the regenerator in the complete CO-burning mode at lower temperature.

The poor adaptive behavior of present control systems for operation in the complete CO-burning mode results in large changes in catalyst circulation rate. For example, change in feedstock to one depositing larger amounts of coke, i.e. to one of poorer quality, results in an increase in the temperature of dense bed 23 in FIG. 1, and an increase in the temperature sensed by thermocouple 9. This in turn induces controller 10 to act on valve 5 in the direction of lowering the cat-to-oil ratio, thus restoring regenerator and product temperatures to within prescribed limits. However, those skilled in the art recognize that a poorer quality feedstock requires a higher severity treatment to maintain optimum cracked product distribution. Therefore, the adjustment in cat-to-oil ratio induced by the control system is counterproductive, and its extent is another aspect of the poorly adaptive behavior of the prior art control system.

Thus, the relatively deficient adaptive behavior of the conventional control scheme in the complete CO-burning mode is a serious deficiency of the system, which counteracts to some extent the very desirable advantages, described above, that may be obtained from the system.

The present invention provides an improved control system which increases the adaptive behavior of the catalyst section of a fluid catalytic cracking unit operating in the complete CO-burning mode. Improved control is achieved by including, as control elements, variable preheat of the air feed to the regenerator and variable recycle, within the hereinbelow prescribed range of recycle ratios, of hot regenerated catalyst to recovered contaminated catalyst, i.e. spent catalyst. In particular, in response to a disturbance such as may be caused by a change of feedstock quality, the air preheat temperature and recycle ratio are adjusted to a greater or lesser extent, as hereinafter described, and in a direction to restore the temperature of the hot regenerated catalyst to a predetermined temperature. For example, with a change to a more aromatic feedstock, i.e. one which produces more coke, the air preheat temperature is reduced and the recycle ratio increased in response to the increase in temperature of the hot regenerated catalyst, thus controllably reducing the latter temperature.

Because the heat capacity of the air feed is substantial, and because its temperature may be varied in the range of about 300° F to 1200° F, the method of this invention provides a wide range of controllability without departure from optimal operation of the cracking section. In fact, the method provides means for effectively decoupling the catalyst circulation rate from feedstock quality. One may choose, for example, to fix the catalyst circulation rate, in which case disturbances in the reactor section are brought under control solely by adjustment of the air feed preheat temperature. Alternatively, by proper adjustment of the gain in the feed preheat analog controller hereinafter described, one may choose to partition the control of a disturbance between catalyst circulation rate and feed preheat temperature. In a particularly desirable embodiment of the method of this invention, the gain in the feed preheat analog controller is programmed in such a manner, as guided by a model of the cracking process, as to maintain an optimal cat-to-oil ratio for various feedstocks. Thus, it is evident that the method of this invention not only functions as a control method but it may, in addition, be used also as an optimization tool.

A further improvement in control is achieved by also including, as a control element, the recycle of variable proportions of hot regenerated catalyst to spent catalyst to vary the temperature of the latter in controlled fashion. A feature of this control element is its very short response time which contributes to stable operation in addition to extending the adaptive range.

Figure 3:
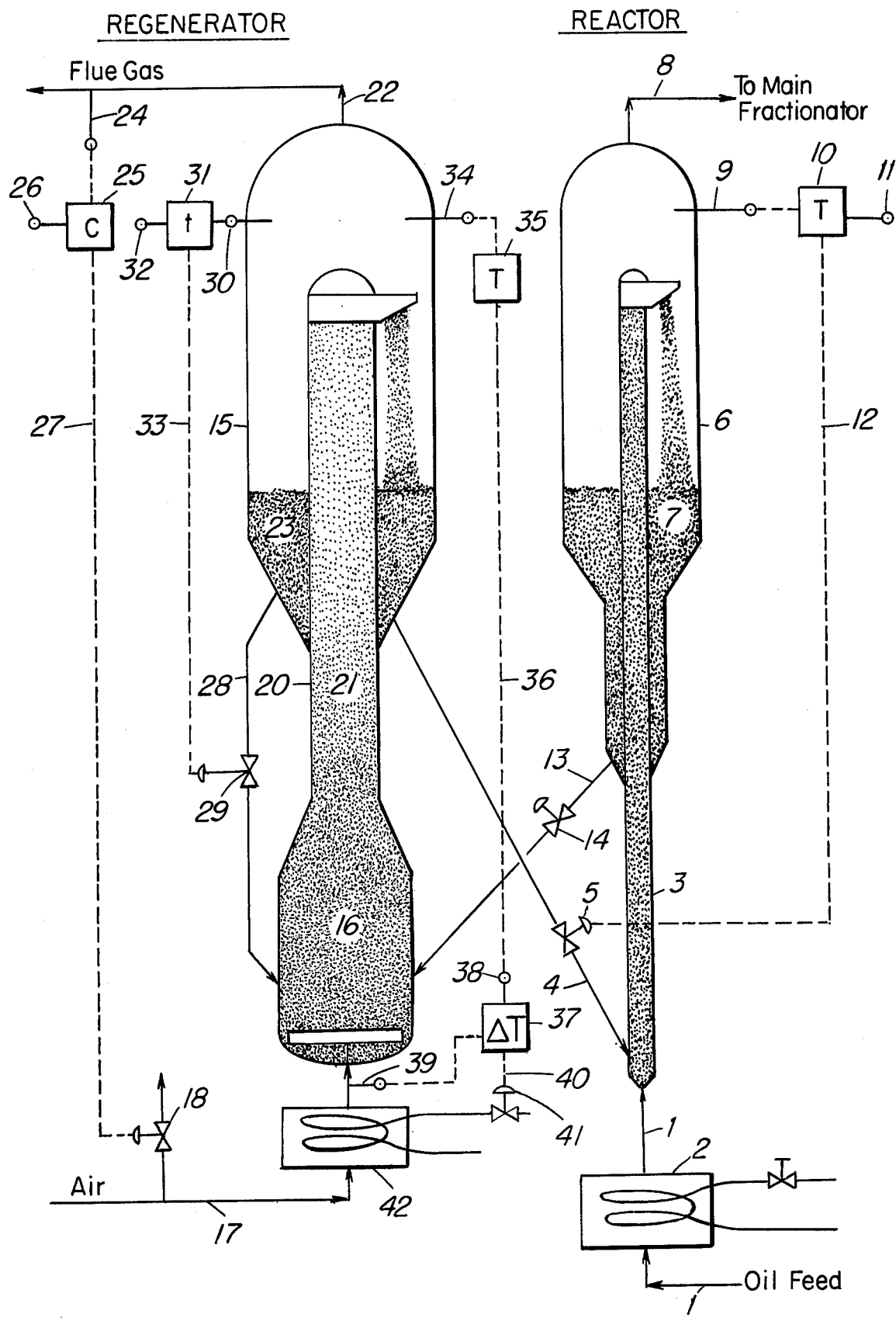
FIG. 3 is a schematic representation of a catalyst section control system according to this invention.

An embodiment of this invention is now described in detail by reference to FIG. 3 of the drawing. In FIG. 3, the essential elements previously identified in FIG. 1 are indexed by identical numerals. Additionally, in the present invention, there is provided a thermocouple or other temperature sensing means 34 which generates a representation of the temperature in the upper portion of regenerator 15. Optional locations for the temperature sensing means 34 are in flue gas conduit 22 or in regenerated catalyst bed 23. The representation generated is passed to temperature measuring means 35 which places a signal, representative of the regenerated catalyst temperature, on line 36 connected with temperature difference controller 37. There is provided a thermocouple or other temperature sensing means 39 which generates a representation of the temperature of the preheated air feed in the portion of line 17 downstream of air preheat means 42. This representation, too, is passed to the temperature difference controller 37. Preheat means 42 is preferably a heat exchanger, although sometimes an in-line burner may be used. The signal placed on line 36 adjusts the set point 38 of controller 37 in a predetermined fashion, and the controller places a signal on line 40 causing an adjustment of valve means 41 which controls the amount of steam or other heating medium passed to preheater 42, which in turn controls the air preheat temperature.

To include the catalyst recycle ratio as an element of control, one or more conduits 28 are provided for transferring regenerated catalyst 23 to partially regenerated catalyst 16. Alternatively, a conduit 28 may return regenerated catalyst directly to spent catalyst transfer line 13. In any case, the one or more conduits 28 are equipped with effective flow control means, such as valve means 29, capable of varying the recycle ratio, i.e.

the ratio of the weight of regenerated catalyst transferred via conduit 28 to the weight of spent catalyst transferred via spent catalyst transfer line 13, in unit time. In essence, the function of the one or more conduits 28 is to recycle a portion of the substantially hotter regenerated catalyst 23 to the cooler catalyst 16 thereby raising the temperature of the latter. For convenience, the catalyst in bed 16 as well as that transferred from bed 7 via line 13 will be referred to as "spent" catalyst.

Additionally, there is provided a thermocouple or other temperature sensing means 30 which generates a representation of the temperature in the upper portion of regenerator 15. This representation is transmitted to the temperature controller 31 equipped with a set point 32. A deviation of the temperature measured by temperature sensing means 30 from the predetermined temperature established by the set point 32 causes the controller 31 to place a signal on line 33, which in turn causes valve means 29 to alter the recycle ratio in a direction to restore the measured temperature to the predetermined temperature. For example, if the temperature measured by 30 exceeds the predetermined temperature, valve means 29 opens to increase the recycle ratio and lower the temperature in the upper portion of regenerator 15.

Alternative locations for temperature sensing means 30 include locations in flue gas line 22 or in dense fluidized bed 23.

An optional system (not shown) for controlling the regenerator temperature is provided by two thermocouples located in beds 23 and 16 respectively. The signals provided by these are transmitted to a controller which compares the temperature difference with a predetermined temperature difference and generates a control signal which, transmitted to valve 28, changes the recycle ratio in a direction to reduce the deviation of the measured temperature difference from the predetermined value. Similarly, other regenerator temperature differences may be used instead of thermocouple 34 to place a signal on line 36.

Although the illustration of this invention as shown in FIG. 3 employes automatic controllers 10, 25, 31 and 37, it is to be understood that manual control may be substituted for one or more of these units. Automatic controllers are preferred, however, and these may be of the P-D-I- (proportional-differential-integral) or less sophisticated type, depending on the requirements of the operation.

The cooperative behavior of the air-feed preheat temperature control and the recycle ratio control, as described in this invention, may be illustrated as follows. Assume an abrupt change in the feedstock charged to a fluid catalytic cracking apparatus with the regenerator operating in the complete CO-burning mode, the change causing a rapid reduction of carbon on spent catalyst. While ordinarily such a change would result in increased cat-to-oil ratio and such an increase would be counterproductive, in one embodiment of the method of this invention the cat-to-oil ratio is fixed and the air feed preheat temperature is increased by an appropriate amount. While this adjustment is occurring, the rapidly acting recycle ratio would be increased, but maintained within the range of at least about 0.7 to about 5, thus modulating the disturbance, which might be fully absorbed by the cooperating air-feed preheat adjustment when fully effective. The calculations made by mathematically simulating the behavior of a regenerator and presented below illustrate the effectiveness of the recycle ratio element of control in this instance.

Let us assume that the carbon on spent catalyst is reduced from its prior value of 0.70 wt.% to 0.65 wt.%, and there is no effect yet of air preheat adjustment, and that it is required to maintain the flue gas content of CO at a maximum level of 0.20%. This change results in a reduction of the temperature in dense bed 16 and at top of riser 20 of FIG. 3, and excessive CO emissions, because the amount of carbon supplied to the regenerator is decreased. This is illustrated by comparison of items 3 and 8 of Table I. Without change of the recycle ratio, no adjustment of air flow rate can be made to restore CO emissions to required levels, (compare items 5–8 inclusive, Table I). On change of recycle ratio from 1 to 2, however, restoration of CO control is achieved along with other desirable parameters (compare items 3 and 11, Table I), obviating the necessity for any large disturbance in cat-to-oil ratio or other operating parameters. This illustration is given to show how the two elements of control perform and cooperate to improve adaptive behavior, and is intended to be strictly illustrative and in no way limiting on the scope of the invention.

TABLE I

| | | REGENERATOR BEHAVIOR | | | | | |
|---|---|---|---|---|---|---|---|
| | Air Flow | Temp. ° F | | | | | |
| | lbs/lb | | Top | Flue Gas, Vol % | | | Carbon on |
| Item | Carbon to | Dense | of | Excess | | | Regenerated |
| No. | Regenerator | Bed | Riser | $O_2$ | CO | $CO_2$ | Catalyst, wt. % |
| (For 0.70 wt.% C on spent catalyst, recycle ratio 1.0) | | | | | | | |
| (1) | 11 | 1231 | 1275 | 0 | 2.36 | 15.1 | 0.11 |
| (2) | 12 | 1242 | 1305 | 0 | 0.32 | 16.4 | .08 |
| (3)* | 13 | 1242 | 1316 | 0.87 | 0.14 | 16.0 | .06 |
| (4) | 14 | 1231 | 1311 | 2.18 | 0.20 | 15.0 | .05 |
| (For 0.65 wt.% C on spent catalyst, recycle ratio 1.0) | | | | | | | |
| (5) | 11 | 1213 | 1259 | 0 | 1.68 | 15.4 | 0.12 |
| (6) | 12 | 1222 | 1283 | 0.22 | 0.23 | 16.3 | .09 |
| (7) | 13 | 1218 | 1287 | 1.31 | 0.25 | 15.5 | .07 |
| (8) | 14 | 1192 | 1264 | 3.06 | 0.57 | 13.9 | .08 |
| (For 0.65 wt.% C on spent catalyst, recycle ratio 2.0) | | | | | | | |
| (9) | 11 | 1231 | 1258 | 0 | 2.27 | 15.1 | 0.10 |
| (10) | 12 | 1229 | 1269 | 0.05 | 0.38 | 16.4 | 0.09 |
| (11)* | 13 | 1255 | 1299 | 0.77 | 0.14 | 16.1 | 0.06 |
| (12) | 14 | 1216 | 1264 | 2.86 | 0.45 | 14.2 | 0.07 |

*These items show optimal operation.

The illustrations encompassed by Table I show operation with recycle ratios of 1 to 2, which are greater than the ratio of at least about 0.7 required in this invention.

The functioning of the recycle control element to improve the adaptability of a catalyst section operating in the complete CO-burning mode is further represented by a series of calculations presented below. For purposes of illustration, the following conditions were assumed:

A fixed piece of equipment — adiabatic in operation
  Dense phase volume: 5,600 cu. ft.
  Dilute phase volume: 14,000 cu. ft.
Spent Catalyst
  Circulation: 60 tons/minute
  Carbon Content: 0.90 wt. %
  Catalyst Inlet Temperature: 960° F
  Total Hold Up: 120 tons (80% in dense bed, 20% in riser)
  Catalyst Residence time in the dense catalyst bed and riser: 2 minutes (with no recycle)
Regenerator Air
  Low Rate: 906,000 lb/hr
  High Rate: 1,120,000 lb/hr
  Inlet Air Temperature: 325° F The calculations made assume uniform mixing of catalyst particles and a slow carbon burning rate proportional to the average concentration of carbon on the catalyst in the dense bed. The burning of CO to $CO_2$ proceeds at a slow rate in the dense fluidized bed. The rate of this reaction is much higher in the gas phase in the absence of catalyst. The calculations were made with two assumptions for the rate of CO reaction in the riser:
  (1) the homogeneous gas phase rate,
  (2) a rate 10% of the homogeneous gas phase rate, For rapid, homogeneous carbon monoxide burning in the gas phase the temperature must be above 1250° F.

One series of calculations not provided herein was made with a low air rate. This was operable with undesired residual coke on regenerated catalyst and high CO in the flue gas and as soon as regenerated catalyst recycle was practiced, temperatures rose, carbon burned increased, but the CO content of the flue gas also increased beyond desired limits because of insufficient air, and also the flue gas contained zero oxygen. This type operation is considered undesirable because of the high concentration of CO in the flue gases.

A more meaningful operation supplies enough oxygen to burn the carbon to $CO_2$. Table II reports the data obtained assuming homogeneous CO burning in the riser and high air rates. However, in actual operation the rate of CO burning in the riser is depressed by the presence of catalyst solids.

TABLE II (High Air Rate - Homogeneous CO Burning in Riser)

| | Temperature, ° F. | | | Carbon on Regen. Cat., wt. % | | Gas Out, mol. % | |
|---|---|---|---|---|---|---|---|
| Recycle Ratio | Cat Mix to Regenerator | Top of Dense Bed | Top of Riser | Top Dense Bed | Top Riser | CO | $O_2$ |
| 0 | 960 | 1172 | 1404 | 0.21 | 0.011 | .004 | 2.42 |
| 1.0 | 1180 | 1291 | 1400 | 0.06 | 0.01 | 0.004 | 2.7 |
| 2.0 | 1243 | 1321 | 1393 | 0.044 | 0.016 | 0.005 | 2.4 |
| 3.0 | 1271 | 1330 | 1383 | 0.040 | 0.020 | .007 | 2.47 |

Table III is yet a further variation in which a high air was used and the CO burning rate was assumed to be only 10% of the homogeneous 30% burning rate. In this series 30% of the spent catalyst entering the regenerator was directed into catalyst carried overhead from the lower dense bed and into the riser; the other 70% was directed into the lower dense bed of catalyst.

The data in Table III shows that the mol % CO in the flue gas and the wt.% carbon on regenerated catalyst are at a minimum at some value of the recycle ratio greater than 0 but less than 1. In this same range, the temperature of the hot regenerated catalyst, which is the top of riser temperature, is at a maximum. For purposes of this invention, the recycle ratio should at all times be at least about 0.7 to avoid high CO emissions and high values of carbon on regenerated catalyst.

TABLE III (High Air Rate, CO burning rate 10% of homogeneous)

| | Temperature, ° F. | | | Carbon on Regen. Cat., wt. % | | Gas Out. mol. % | |
|---|---|---|---|---|---|---|---|
| Recycle Ratio | Cat. Mix to Regenerator | Top of Dense Bed | Top of Riser | Top Dense Bed | Top Riser | CO | $O_2$ |
| 0 | 960 | 1129 | 1323 | 0.221 | 0.131 | 1.81 | 5.0 |
| 1 | 1222 | 1298 | 1410 | 0.037 | 0.032 | 0.12 | 2.2 |
| 2 | 1252 | 1301 | 1360 | 0.036 | 0.04 | 0.22 | 3.1 |
| 3 | 1269 | 1305 | 1350 | .034 | 0.049 | 0.25 | 3.48 |

The above calculations illustrate the control that is achieved by varying the recycle ratio from at least about 0.7 to 3. As a consequence of inclusion of the recycle element in the control system, variations in the quality of feedstock or other disturbances leading to temperature changes in the regenerator are moderated within the regenerator itself, thus eliminating or reducing changes of temperature of the regenerated catalyst passed to the reactor and counterproductive changes of the cat-to-oil ratio.

Whereas the illustrations encompassed by Tables I and II illustrate operation with recycle ratios of at least about 0.7 to 3, which represents a preferred range, recycle ratios up to about 5 may be usefully employed. The control mode is preferably set at some intermediate recycle ratio corresponding to normal performance in the absence of disturbances.

Whereas the present invention describes control of the catalyst section of a fluid catalytic cracking process by utilizing, as an element of control, variable preheat of the air to the regenerator, copending U.S. Application Ser. No. 769,638 filed on even date herewith describes a similar invention wherein the oil preheat temperature is varied. It is to be understood that either of these two inventions may be used alone. However, combinations of the two control methods are contemplated, and may be advantageously employed in certain circumstances.

What is claimed is:
1. In a fluid catalytic cracking process for cracking a hydrocarbon feed stream, wherein said stream is contacted with hot regenerated catalyst in a reactor section maintained under catalytic cracking conditions to form cracked products and spent catalyst contaminated by coke; and wherein said cracked products and spent catalyst are separated in, and recovered from, said reactor section; and wherein said recovered spent catalyst is continuously circulated through a regenerator section operating in the complete CO-burning mode thereby burning said contaminating coke by contact with air and forming hot regenerated catalyst and flue gas at substantially the same temperature, said hot regenerated catalyst having a temperature substantially higher than said spent catalyst, said regenerator section being provided with adjustable means for recycling a portion of hot regenerated catalyst to said recovered spent catalyst; and also with adjustable means for preheating said air; and wherein hot regenerated catalyst is recirculated to said reactor section, the method for controlling the process, whereby improving its adaptive behavior, which comprises:

comparing the temperature of the hot regenerated catalyst with a predetermined temperature to obtain a regenerated catalyst temperature deviation; and, adjusting within the regenerator section, the recycle of hot regenerated catalyst to spent catalyst to change the recycle ratio in a direction to reduce said temperature deviation, said recycle ratio being in the range of at least about 0.7 to about 5 before and after said change; and adjusting the air preheat temperature in a direction to reduce said regenerated catalyst temperature deviation.

2. The method of claim 1 wherein said recycle ratio is adjusted within the range of at least about 0.7 to 3.

3. The method of claim 1 including the steps of comparing the carbon monoxide content of the flue gas discharged from said regenerator section with a predetermined carbon monoxide content to obtain a carbon monoxide content deviation, and adjusting the flow of oxygen-containing gas to said regenerator in a direction to reduce said carbon monoxide content deviation.

4. The method of claim 2 including the steps of comparing the carbon monoxide content of the flue gas discharged from said regenerator section with a predetermined carbon monoxide content to obtain a carbon monoxide content deviation, and adjusting the flow of oxygen-containing gas to said regenerator in a direction to reduce said carbon monoxide content deviation.

5. The method of claim 3 wherein said predetermined carbon monoxide has a value up to about 2000 ppm.

6. The method of claim 4 wherein said predetermined carbon monoxide content has a value up to about 2000 ppm.

7. The method of claim 1 wherein said adjusted air preheat temperature is maintained within the range of 300° F to 1200° F.

8. The method of claim 1 wherein is included the additional step of fixing the amount of hot regenerated catalyst contacted with said hydrocarbon feed stream.

9. The method of claim 1 wherein a temporary adjustment of said recycle ratio is made thereby modulating said regenerated catalyst temperature deviation.

* * * * *

UNITED STATES PATENT AND TRADEMARK OFFICE
CERTIFICATE OF CORRECTION

PATENT NO. : 4,093,537
DATED : June 6, 1978
INVENTOR(S) : Benjamin Gross and Wooyoung Lee It is certified that error appears in the above-identified patent and that said Letters Patent are hereby corrected as shown below:

Column 9, line 62            "30%" should be -- CO --

Signed and Sealed this

Nineteenth Day of December 1978

[SEAL]

Attest:

RUTH C. MASON
Attesting Officer

DONALD W. BANNER
Commissioner of Patents and Trademarks